(No Model.)

T. E. AVERY.
DRAINAGE TRAP.

No. 474,205.

Patented May 3, 1892.

WITNESSES
C. M. Gallaher
M. A. Huggard

INVENTOR
Thomas E. Avery
By A. M. Wooster
Atty.

UNITED STATES PATENT OFFICE.

THOMAS E. AVERY, OF DANBURY, CONNECTICUT.

DRAINAGE-TRAP.

SPECIFICATION forming part of Letters Patent No. 474,205, dated May 3, 1892.

Application filed August 6, 1891. Serial No. 401,862. (No model.)

*To all whom it may concern:*

Be it known that I, THOMAS E. AVERY, a citizen of the United States, residing at Danbury, in the county of Fairfield and State of Connecticut, have invented certain new and useful Improvements in Drainage-Traps; and I do hereby declare the following to be a full, clear, and exact description of the invention, such as will enable others skilled in the art to which it appertains to make and use the same.

My invention has for its object to produce a trap adapted for general use in connection with drainage-pipes either inside or outside of a building, which shall be so constructed that it may readily be cleaned by any person skilled or unskilled in the art, which may be perfectly drained at any time should there be danger of freezing or for any other purpose, and which when being cleaned or being drained will effectually cut off all connection with the sewer, thereby preventing the escape of gas.

With these ends in view I have devised a novel movable trap, of which the following description, in connection with the accompanying drawings, is a specification, numbers being used to designate the several parts.

Figure 1:
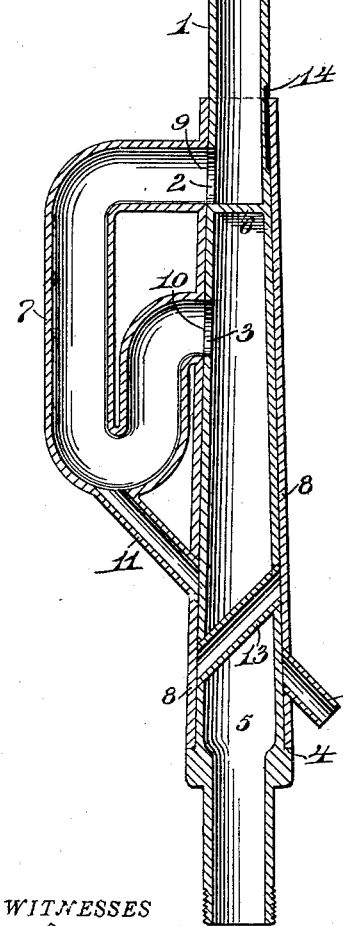
Figure 2:
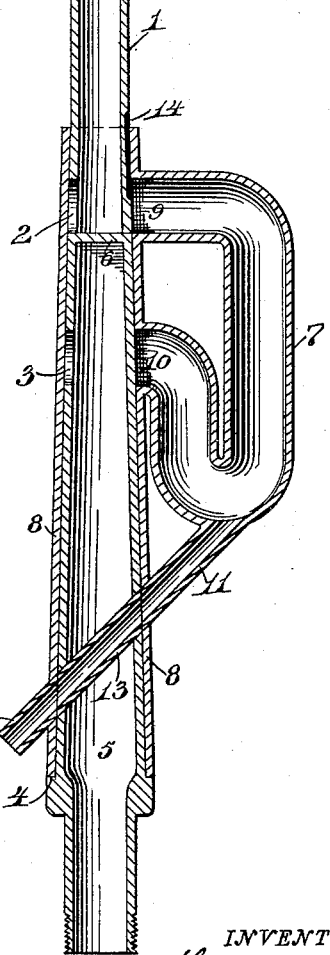

Figure 1 is a longitudinal section of my noval trap in the normal—*i. e.*, the operative—position; and Fig. 2 is a similar section in the draining position, the house end of the pipe being at this time wholly cut off from the sewer.

1 denotes the pipe, which is provided with openings 2 and 3, preferably placed one above the other on one side of the pipe, as shown in the drawings, and with a shoulder 4. Pipe 1 is attached to the ordinary pipes of the system in any suitable or preferred manner. I have shown it as provided with screw-threads at both ends. I preferably make this pipe taper downward and outward slightly, so as to form an internal enlargement 5, the purpose of which will presently be explained. Just below upper opening 2 is a cross-piece 6, which wholly closes the pipe and cuts off all connection with the sewer.

7 denotes the trap proper, which is carried by a sleeve 8, said sleeve corresponding with the shape of the pipe and resting upon shoulder 4, as clearly shown.

The trap may be of any ordinary or preferred form. I ordinarily use a simple U-trap, as shown in the drawings.

The two ends of the trap correspond with openings 9 and 10 in the sleeve, said openings being adapted when in operative position to register with openings 2 and 3 in the pipe, as shown in Fig. 1, said openings, however, being cut off from the sewer connection by the closed side of pipe 1 when the trap is in the draining position, as shown in Fig. 2.

11 denotes a draining-pipe extending downward from the lowest portion of the trap and passing through sleeve 8, and 12 is a downwardly-extending pipe, the upper end of which passes through the sleeve, the lower end serving as a delivery.

13 is a closed pipe, which extends diagonally through enlargement 5 in pipe 1, the ends of said pipe extending through pipe 1. It will thus be seen that this pipe is closed within the enlargement, but that the two ends are open. This pipe is adapted, when the trap is turned to the draining position, to form a connection between pipes 11 and 12, as clearly shown in Fig. 2, so that the contents of the trap will pass through said pipes 11, 12, and 13 and outside of the entire fixture.

In practice I preferably make the upper end of pipe 1 long enough, so that without disconnecting the trap from the regular connections the sleeve and trap proper may be raised above opening 2, so as to permit the ready removal of any sediment or other matter that may have collected in the pipe. The special purpose of enlargement 5 is to increase the capacity of pipe 1 at that place, so as to compensate for the space occupied by pipe 13.

14 denotes a groove formed in pipe 1 for the purpose of serving as an air-vent when the trap is in the draining position, as in Fig. 2. As soon as the trap is moved to that position, air will enter at the vent, pass into the trap, and cause it to drain perfectly. In practice any suitable locking device may or may not be used to hold the trap in the operative position.

The ordinary operation is as follows: Water entering pipe 1 at the top passes into the trap at openings 2 and 9, fills the trap full, and the surplus passes back into pipe 1 through openings 3 and 10, and so on out through the regular pipes of the system. Should it be desired at any time to shut off all connection with the sewer or to drain the trap—as, for example, when there is danger of freezing—sleeve 8 and the trap are given a half-turn about pipe 1—that is, from the position shown in Fig. 1 to that shown in Fig. 2. The effect of this movement is to cause pipes 11, 12, and 13 to register, as already described, and to permit air to enter the trap at vent-groove 14, so that the trap is completely drained instantly. It should be noted that in this position of the parts there is absolutely no connection whatever with the sewer, pipe 1 being closed above opening 3 by the cross-piece and both openings 2 and 3 being covered by the sleeve. The trap also is cut off from the sewer, as opening 10 is wholly covered by the closed side of the pipe 1, pipe 11 being closed at all times against connection with the sewer, it being closed by pipe 1 when in operative position and in connection with pipes 12 and 13 when in the draining position.

Having thus described my invention, I claim—

1. A trap consisting of a pipe having openings in one side and a cross-piece below the upper opening, a trap proper carried by a sleeve, the ends of which trap are adapted to register with the openings in the pipe or to be closed by said pipe when the sleeve is turned.

2. A trap consisting of a pipe having a shoulder 4, openings in one side, a cross-piece below the upper opening, and a sleeve resting upon the shoulder and covering said openings, said sleeve being provided with a trap of ordinary construction, the ends of which are adapted to register with the openings in the pipe.

3. A trap consisting of a pipe having openings in one side, a cross-piece below the upper opening, and a pipe 13, leading through said pipe and closed within it, a sleeve carrying a trap of ordinary construction, the ends of which are adapted to register with the openings in the pipe, and a pipe leading from the bottom of the trap through the sleeve in position to register with pipe 13 when the sleeve is turned, so that the trap may be drained, substantially as described.

4. The combination, with pipe 1, having openings in one side, a cross-piece below the upper opening, and a pipe 13, leading through it and open at the ends, of a sleeve surrounding said pipe and adapted to turn thereon, a trap carried by said sleeve and having openings adapted to register with the openings in the pipe, a pipe leading from the bottom of the trap and adapted to register with pipe 13, and a pipe 12, leading from the other side of the sleeve in line with the pipes leading from the trap.

5. The combination, with pipe 1, having openings in one side, a cross-piece below the upper opening, a vent 14 above the upper opening, an enlargement 5, and a pipe 13, extending through said enlargement and closed within it, of a sleeve adapted to turn on said pipe and carry a trap the ends of which are adapted to register with the opening in said pipe when in operative position and to be closed by said pipe when not in operative position, and a pipe connecting with the bottom of the trap and the sleeve in such position as to register with pipe 13 when it is required to drain the pipe.

In testimony whereof I affix my signature in presence of two witnesses.

THOMAS E. AVERY.

Witnesses:
JAS. B. WILDMAN,
HENRY M. ROBINSON.